United States Patent [19]

Duke et al.

[11] Patent Number: 5,349,825
[45] Date of Patent: Sep. 27, 1994

[54] SYSTEM AND METHOD FOR DISPENSING A CONFECTIONERY PRODUCT USING A PERISTALTIC PUMP

[75] Inventors: Daniel G. Duke, East Moline; Kenneth J. Emody, Geneseo; Gary P. Almblade, East Moline, all of Ill.

[73] Assignee: H. C. Duke & Son, Inc., East Moline, Ill.

[21] Appl. No.: 63,443

[22] Filed: May 18, 1993

[51] Int. Cl.$^5$ .............................................. A23G 9/20
[52] U.S. Cl. ......................................... 62/69; 62/306; 417/477 R
[58] Field of Search ...................... 62/69, 70, 306, 307; 417/477

[56] References Cited

U.S. PATENT DOCUMENTS

| | | | |
|---|---|---|---|
| 3,365,910 | 1/1968 | Grose | 062/069 X |
| 3,597,124 | 8/1971 | Adams | 417/477 |
| 4,142,845 | 3/1979 | Lepp et al. | 417/477 |
| 4,179,249 | 12/1979 | Guttmann | 417/477 |
| 4,187,057 | 2/1980 | Xanthopoulos | 417/63 |
| 4,210,138 | 7/1980 | Jess et al. | 128/214 E |
| 4,515,584 | 5/1985 | Abe et al. | 604/66 |
| 4,540,351 | 9/1985 | Olson | 417/476 |
| 4,559,040 | 12/1985 | Horres et al. | 604/153 |
| 4,631,007 | 12/1986 | Olson | 417/476 |
| 4,631,008 | 12/1986 | Stenner | 417/477 |
| 4,639,156 | 1/1987 | Stern et al. | 417/477 X |
| 4,813,855 | 3/1989 | Leveen et al. | 417/477 |
| 4,925,376 | 5/1990 | Kahler | 417/477 |
| 5,213,483 | 5/1993 | Flaherty et al. | 417/477 |

*Primary Examiner*—William E. Tapolcai
*Attorney, Agent, or Firm*—Arnold, White & Durkee

[57] ABSTRACT

A dispensing system and method for moving a confectionery mixture having a predetermined ratio of air to fluid to a freezing cylinder comprises a multiple portion tube containing the confectionery mixture, an air meter for controlling the ratio of air to fluid in the mixture, and a peristaltic pump for pumping the confectionery mixture through the tube. The peristaltic pump is positioned between a reservoir and the freezing cylinder and the tube is routed through the pump to form a generally U-shaped trough. When the pump is idle, some of the confectionery mixture settles in the generally U-shaped tube to form a liquid which prevents air from back flowing from a pressure side to a suction side of the pump. Accordingly, the consistency of the confectionery product is maintained when the pump is idle. The peristaltic pump also includes a proximity switch which prevents the pump from operating until all of its movable parts are properly secured.

5 Claims, 3 Drawing Sheets

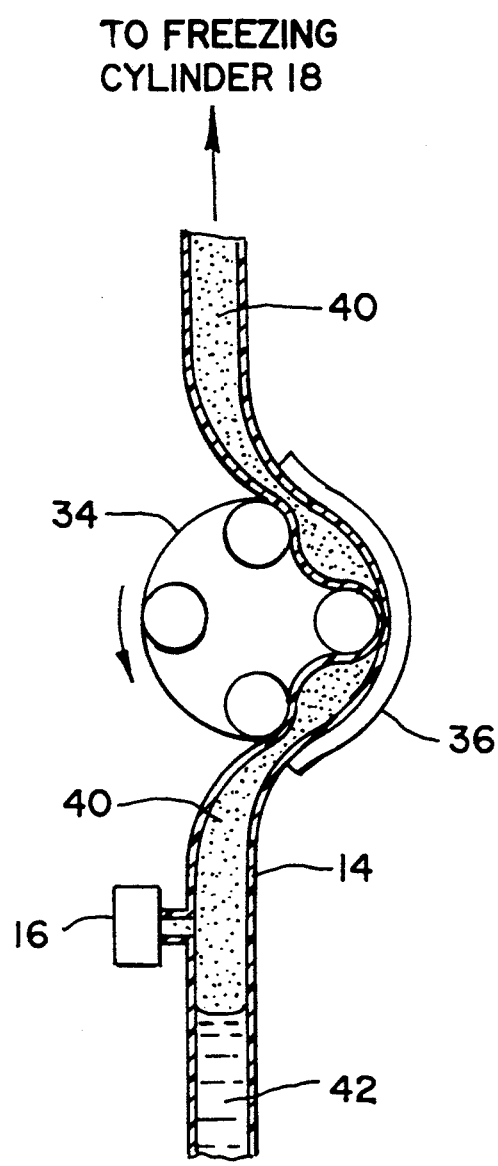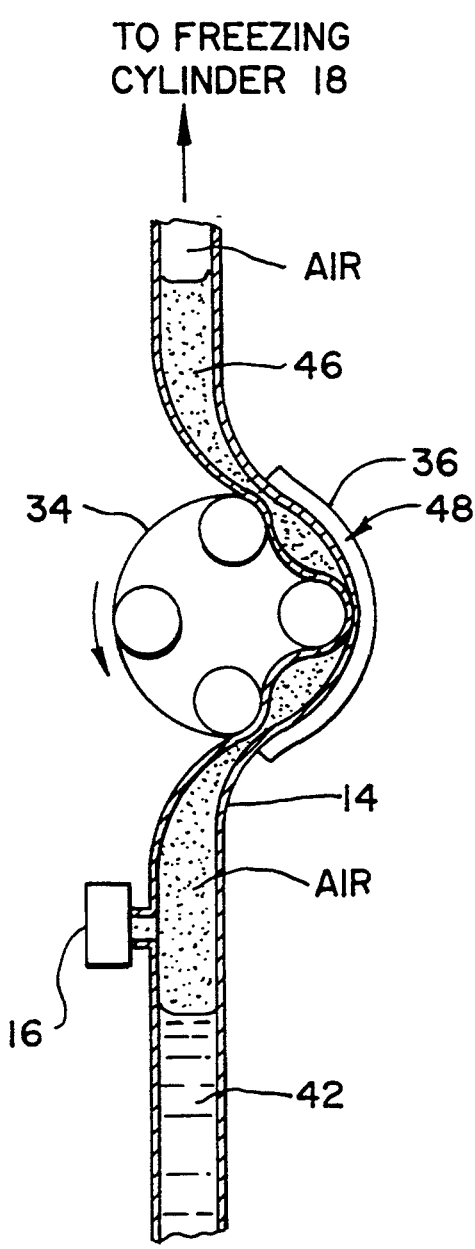

SYSTEM AND METHOD FOR DISPENSING A CONFECTIONERY PRODUCT USING A PERISTALTIC PUMP

FIELD OF THE INVENTION

The present invention is a confectionery dispensing system and method for moving a confectionery mixture of air and fluid with a predetermined air-to-fluid ratio through a tube extending from a reservoir to a freezing cylinder and for maintaining the air-to-fluid ratio in the confectionery mixture when the system pump is idle. The dispensing system uses a peristaltic pump to move the air and fluid mixture in such a manner that the confectionery mixture does not come into direct contact with the pump.

DESCRIPTION OF THE PRIOR ART

In the dispensing of a confectionery product such as soft serve ice cream or yogurt, maintaining the consistency of the product is necessary in order to meet quality standards. A significant factor in determining the consistency of the confectionery product is the ratio of air to fluid in the mixture which comprises product. The failure to maintain a desired air-to-fluid ratio in the mixture results in fluctuations in the consistency of the product. The marketing of a confectionery product which does not have a controllable consistency negatively effects the acceptance or sales of the product. Thus, in a confectionery dispensing system it is very desirable to control the consistency of the confectionery product.

Confectionery products, such as soft serve ice cream and yogurt are typically produced in a dispensing system in which a fluid is drawn from a reservoir and a predetermined amount of air is added to the fluid to create a mixture of a desired consistency or texture. The mixture is then sent to a freezing cylinder, as needed, for dispensing to fill the requirements of customers.

One drawback of these known systems is that a complex network of check valves is required to maintain the consistency of the confectionery mixture when the pump is idle. When the pump is idle, the fluid and air mixture, substantially separates. In this situation, without check valves, the air in the flexible tubing has a tendency to back flow from the pressure side of the pump to the suction side of the pump. This unregulated back flow of air changes the air-to-fluid ratio in the confectionery mixture and, accordingly, changes the consistency of the mixture delivered to the freezing cylinder after the pump is reactivated. The use of the network of check valves increases the overall cost of the dispensing system. In addition, since the system must be periodically cleaned for proper sanitation, the number of check valves increases the time necessary for cleaning the system and hence increases the cost of maintaining the system in operating order. Thus, a need exists for a dispensing system without a complex network of check valves but which prevents fluctuation in the air-to-fluid ratio in the confectionery mixture when the pump is not operating or is idle.

Another drawback in known systems is that the confectionery mixture is passed directly through the pump so that the pump comes into direct contact with the mixture. This direct contact with the pump makes the periodic disassembly and cleaning of the pump necessary in order to maintain sanitary health requirements. The cleaning of the pump is a time-consuming and labor intensive procedure resulting in increased overhead and the possibility of improper or inefficient cleaning. As a result, a need exists for a system which can be easily cleaned.

Different types of pumps can be used to move fluids through the system. One type of pump to use in a system with the goal of avoiding contact of the fluid with the pump is a peristaltic pump. A typical peristaltic pump includes a sliding portion and a roller assembly mounted around a drive shaft. A special flexible tube containing a fluid is loaded and secured between the sliding portion and the roller assembly by movement of the sliding portion relative to the roller assembly. In one known peristaltic pump, the movement of the sliding portion into a position for engaging the flexible tube is controlled by a camming action. When the rollers are driven in a circular path around the drive shaft by a motor, the tube is intermittently compressed against the sliding portion to move the fluid through the flexible tube. The pump itself does not come into direct contact with the fluid within the flexible tube.

While peristaltic pumps are commonly used in the medical sciences for moving biological fluids or for administering therapeutic agents they have some shortcomings. First, when placing the flexible tubing in the pump the rollers are exposed to the operator and if the operator fails to turn the motor off the operator can inadvertently catch clothing in the roller assembly which can damage the pump. Second, although many peristaltic pumps in the prior art provide mechanisms for loading and removing a flexible tube from the pump, these mechanisms are complex and involve many moving parts. Third, peristaltic pumps, to the inventor's knowledge, have not been used in a confectionery dispensing system at least because of their high cost and because sanitation regulations in the food dispensing field require that the system be cleaned on a periodic basis and the flexible tube presents a difficult cleaning task. Therefore, a need exists for a peristaltic pump and flexible tube construction which can be operated safely, and which is simple and easy to clean.

SUMMARY OF THE INVENTION

The present invention relates to a system and method for pumping a confectionery mixture having a desired air-to-fluid ratio to a freezing cylinder while maintaining the air-to-fluid ratio in the mixture and preventing the degeneration of the ratio when the system is idle. The system uses a peristaltic pump and a specially configured tube which are positioned relative to each other so that the confectionery mixture creates a liquid seal in the tube between the pressure side and the suction side of the pump when the pump is idle. The liquid seal formed in the tubing prevents air from back flowing through the pump and, consequently, eliminates the problem of large fluctuations in the air-to-fluid ratio in the confectionery mixture after the pump is reactivated.

The system of the present invention comprises a detachable multisectioned tube containing the confectionery mixture and a peristaltic pump pumping or moving the confectionery mixture through the system. In the preferred embodiment, the multisectioned tube comprises a stainless steel portion, a compressible plastic portion and a high pressure or burst resistant portion. The stainless steel portion of the tube extends from a reservoir containing a confectionery fluid to the input side of the peristaltic pump. An air meter or orifice combines a preselected proportion of air with the confectionery fluid to form the confectionery mixture with a selected air-to-fluid ratio. The compressible plastic portion of the tube connects to one end of the stainless steel portion of the tube and extends through the peristaltic pump to the output side of the pump. The high pressure portion of the tube connects to the output end of the compressible plastic portion of the tube and extends to the freezing cylinder. The peristaltic pump has a roller assembly and a sliding portion. The compressible portion of the tube is positioned or threaded through the pump so that it is formed into a trough between the roller assembly and the sliding portion of the pump. The trough causes the confectionery mixture to form a liquid seal in the compressible portion of the tube between the pressure side and suction side of the pump when the pump is idle. The liquid seal prevents air which separates from the confectionery mixture when the pump is idle from back flowing to the suction side of the pump and changing the air-to-fluid ratio in the mixture. When the peristaltic pump is operating, the roller assembly intermittently compresses the compressible portion of the tube against the sliding portion to force the confectionery mixture through the tube. The multisectioned tube can be disassembled into its component parts for easy cleaning or cost efficient replacement of worn sections of the tube.

The peristaltic pump of the present invention further includes a proximity switch for preventing operation of the pump while the compression portion of the tube is being inserted or removed from the pump. A lever having an open and closed position simultaneously controls the position of the proximity switch and the sliding portion. Movement of the sliding portion relative to the roller assembly is effected by corresponding movement of the lever. When the lever is in the open position, the proximity switch disengages, rendering the pump inoperative, and the sliding portion is moved away from the roller assembly to allow for insertion or removal of the compressible portion of the tube. Thus, when the lever is in the open position the proximity switch is disengaged and the peristaltic pump will not operate. When the lever is in a closed position, the proximity switch engages, and the sliding portion secures the compressible portion of the tube and the system is operational.

BRIEF DESCRIPTION OF THE DRAWINGS

The advantages of the present invention will become apparent upon reading the following detailed description and upon reference to the accompanying drawings, in which:

FIGS. 3A and 3B illustrate a tube containing a confectionery mixture as it would appear when passing through a peristaltic pump mounted in the alternative embodiment of the present invention;

Figure 1:
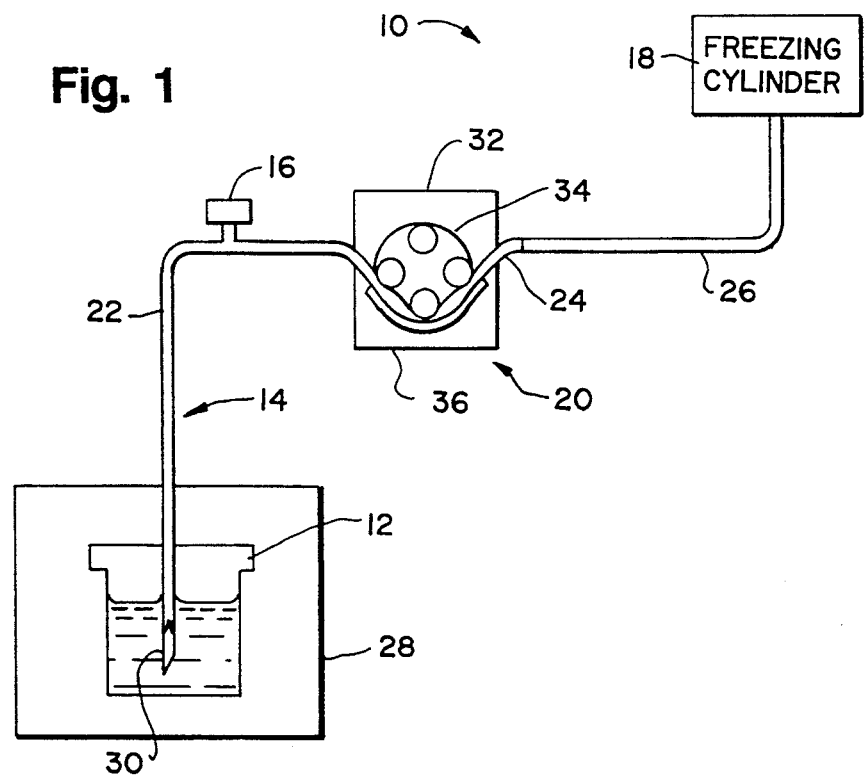
FIG. 1 illustrates the confectionery dispensing system of the present invention.

While the invention is susceptible to various modifications and alternative forms, specific embodiments thereof have been shown by way of example in the drawings and will herein be described in detail. It should be understood, however, that it is not intended to limit the invention to the particular forms disclosed. On the contrary, the intention is to cover all modifications, equivalents, and alternatives falling within the spirit and scope of the invention as defined by the appended claims.

DESCRIPTION OF THE PREFERRED EMBODIMENTS

FIG. 1 shows a confectionery dispensing system 10 according to the present invention for moving a confectionery fluid from a reservoir 12 through a tube 14, mixing the fluid with air from a regulator 16 to form a confectionery air and fluid mixture, and moving the mixture through the tube 14 to a freezing cylinder 18. The confectionery mixture is further blended in the freezing cylinder as is well known in the field. A peristaltic pump 20 pumps the confectionery mixture through the tube 14. The regulator 16 controls the air-to-fluid ratio in the confectionery mixture as is well known in the field. In the preferred embodiment the regulator 16 is an orifice. The size of the orifice 16 determines the air-to-fluid ratio in the confectionery mixture. If the confectionery mixture is soft serve ice cream or yogurt, a higher air-to-fluid ratio will result in a larger ice cream or yogurt volume while a lower air-to-fluid ratio will result in a smaller ice cream or yogurt volume. It is important to maintain the air-to-fluid ratio of the mixture in the tube 14 in order to preserve the consistency of the confectionery mixture.

In the preferred embodiment, the tube 14 comprises a stainless steel portion 22, a commercially available plastic compressible portion 24 and a high pressure or burst resistant portion 26. The stainless steel portion 22 extends from the reservoir 12 to the inlet of pump 20. The air orifice 16 is connected to the stainless steel portion 22 and the operator, as is well known in the field, can adjust the amount of air that mixes with the fluid from the reservoir 12 and thereby regulate the consistency of the confectionery mixture. The plastic compressible portion 24 of the tube 14 press fits to the stainless steel portion 22. However, any well known manner of removably securing the two portions together can be used, for example a standard clamp can be used for added security in maintaining the connection. The plastic compressible portion 24 is positioned through the peristaltic pump 20 and is repeatedly compressed by the operation of the pump as is well known in the art. The high pressure portion 26 of the tube 14 is connected to the compressible portion 24. Again, in the preferred embodiment this connection is a press fit but any other well known manner of removably securing the two portions together can be used. The high pressure portion 26 is strong enough to resist bursting or rupture and is connected to the freezing cylinder 18.

The reservoir 12 is typically placed within a large refrigerated cabinet 28. The reservoir 12 contains a fluid which, when combined with air in the tube 14, forms the confectionery mixture. In order to be able to draw the fluid out of the reservoir 12, the stainless steel portion 22 of the tube 14 extends into the reservoir 12 below the level of the fluid. A check valve 30 is placed within the stainless steel portion 22 to prevent the fluid from flowing back into the reservoir 12 when the pump 20 is idle.

Since it is important to maintain the consistency of the confectionery mixture, the dispensing system 10 is constructed to ensure that the air-to-fluid ratio of the confectionery mixture in the tube 14 remains constant on both the pressure side and the suction side of the pump 20. The pressure side of the pump 20 is to the right in FIG. 1 and the suction side of the pump 20 is to the left FIG. 1.

The peristaltic pump 20 is arranged within the dispensing system 10 to maintain the air-to-fluid ratio of the confectionery mixture in the tube 14 on both sides of the pump 20 but at least the pressure side of the pump 20. The peristaltic pump 20 is described in greater detail hereinafter. However, for the purposes of FIG. 1 the pump 20 is shown as comprising an upper housing 32 holding a roller assembly 34 and a sliding or bottom portion 36. The compressible portion 24 of the tube 14 is positioned in a narrow generally U-shaped gap formed between the roller assembly 34 and the sliding portion 36. The diameter of the compressible tube portion 24 is larger than the width of the U-shaped gap so that when the sliding portion 36 is secured in position a portion of the compressible tube portion 24 is secured tightly within the gap with the interior surfaces of the tube touching under the pressure exerted by the roller assembly 34. In the preferred embodiment, the horizontal path of the compressible tube portion 24 through the pump 20 is generally U-shaped. The precise configuration of the horizontal path is a matter of design choice but in the preferred embodiment maintaining a general trough is critical to having the confectionery mixture form a liquid seal in the tube 14 when the pump 20 is idle as described in detail hereinafter.

Since the tube 14 comprises multiple sections or portions it can be easily disassembled for cleaning. Furthermore, the compressible portion 24 of the tube 14 receives a substantial amount of contact with the roller assembly 34 and accordingly, wears relatively quickly. However, since compressible portion 24 forms only a small portion of the overall tube 14, the cost of replacement is small Accordingly, the three separate portions of the tube 14 each have specific functions and structural characteristics yet combine easily to complete the conduit from the reservoir 12 to the freezing cylinder 18. It should also be understood that the tube 14, the pump 20 and the freezing cylinder 18 may be mounted within a housing or cabinet as is well known in the field but which is not illustrated in the drawings for the sake of clarity.

Figure 2A:
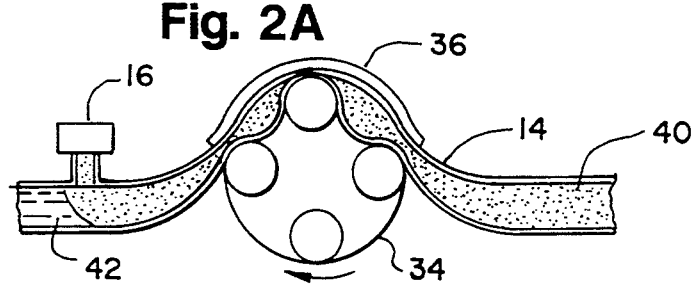
FIGS. 2A and B illustrate a tube containing a confectionery mixture as it would appear when passing through a peristaltic pump mounted in the conventional position.

FIG. 2A illustrates how a confectionery product or mixture 40 such as soft serve ice cream or yogurt which is a mixture of fluid 42 and air would appear in the tube 14 in an operating peristaltic pump (not shown) oriented in a conventional position with the tube 14 passing over the top of the roller assembly 34. The rotation of the roller assembly 34 is shown by the arrow. The pump is not shown for the sake of clarity but the roller assembly 34 and a portion of the sliding portion 36 are illustrated so that the pump position is understood. As is well known, when a peristaltic pump is operating, a roller assembly intermittently compresses the tube 14 to propel the confectionery mixture or product 40 through the tube 14. In FIG. 2A, the fluid 42 is mixed with air from air regulator 16 in order to control the air-to-fluid ratio and, accordingly, the consistency of the confectionery mixture or product 40.

Figure 2C:
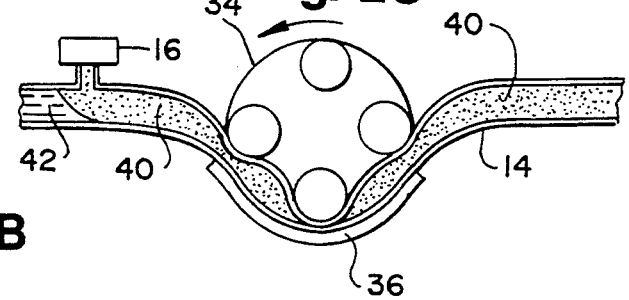
FIGS. 2C and D illustrate a tube containing a confectionery mixture as it would appear when passing through a peristaltic pump mounted in accordance with the present invention.
Figure 2B:
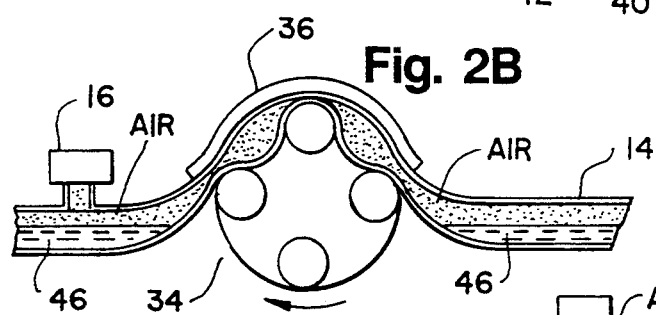

FIG. 2B illustrates how the confectionery mixture 40 separates widen the peristaltic pump is idling or not operating. In this situation, without a complex network of check valves, the air migrates through the tube 14 from the pressure side of the pump to the suction side of the pump (right to left in FIG. 2), and the air-to-fluid ratio for the confectionery mixture changes to form an uncontrolled or diluted confectionery mixture 46. In this situation, when the pump is turned on the air-to-fluid ratio of the mixture delivered to the freezing cylinder 18 and hence the consistency of the confectionery product is uncontrolled. In the preferred embodiment, the pressure side of the pump is at approximately 26 psi and the suction side of the pump is at atmospheric pressure.

FIG. 2C illustrates how a confectionery mixture 40 such as soft serve ice cream or yogurt which is a mixture of fluid 42 and air would appear in the tube 14 in an operating peristaltic pump (not shown) oriented according to the present invention. In the present invention, the tube 14 passes under the roller assembly 34 and forms a trough or generally U-shaped path. The fluid 42 is mixed with air from regulator 16 to control the consistency of the confectionery product 40. Thus, the confectionery product 40 movement in FIG. 2C is the same as in FIG. 2A except that the path of tube 14 in FIG. 2C is under the roller assembly 34 to form a generally U-shaped trough.

Figure 2D:
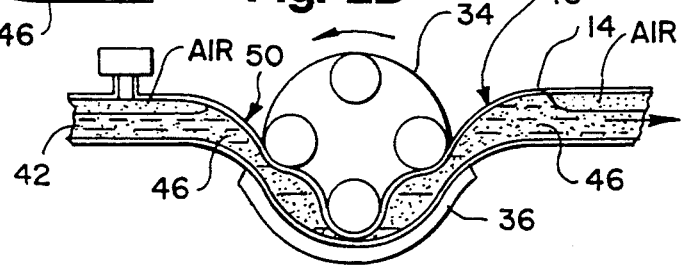

FIG. 2D illustrates how the confectionery product 40 separates into air and the diluted confectionery mixture 46 when the peristaltic pump is idling or not operating. In this situation, a liquid seal is formed by the diluted confectionery mixture 46 in the tube 14 which prevents air from back flowing from the pressure side to the suction side of the pump As described above, when the pump is idle, the confectionery product 40 separates to form air and a diluted confectionery mixture 46. This diluted confectionery mixture 46 collects in the trough portion of the tube 14 and forms a liquid seal at least at point 48 and, in the preferred embodiment, at both points 48 and 50. The confectionery fluid 42 may also contribute to forming the liquid seal at point 50 together with the diluted confectionery mixture 46, depending upon the overall shape of the tube 14 and the position of the air orifice 16. Consequently, the air-to-fluid ratio of the confectionery product on at least the pressure side of the pump is kept constant. The general U-shaped structure of the tube 14 in conjunction with the position of the pump acts as a check valve when the pump is idle or not operating. Of course, the air-to-fluid ratio on the suction side of the pump is also kept constant due to the liquid seal at point 50 together with check valve 30.

In an alternative embodiment illustrated at FIGS. 3A and 3B, the peristaltic pump 20 is rotated 90° from the position shown in FIG. 1. The tube 14 passes vertically through the pump 20 and the confectionery mixture 40 is moved toward the freezing cylinder 18 (not shown) due to the rotation of the roller assembly 34. FIB. 3B shows the system with the pump 20 idle. When the pump 20 is idle or not operating, the air separates from the confectionery mixture 40, forming a dilated confectionery mixture 46. The air also raises to the top of tube 14 on the pressure side of the pump 20. In this embodiment, the pressure side of the pump is the top and the suction side is the bottom. The diluted confectionery mixture 46 does not pass through the tube 14 at the location being compressed by the roller assembly 34 so that a liquid seal is formed generally at point 48. Of course, on the suction side of the pump 20 air is accumulated next to the roller assembly 34 and the confectionery liquid fills the remainder of the tube 14 and is prevented from flowing back into reservoir 12 by the check valve 30. The diluted confectionery mixture 46 forms a liquid seal on only the pressure side of the pump 20. Of course, the mechanical tolerances necessary to have the roller assembly 34 compress the tube 14 to prevent the diluted confectionery mixture 46 from backflowing through plump 20 must be maintained.

Figure 4:
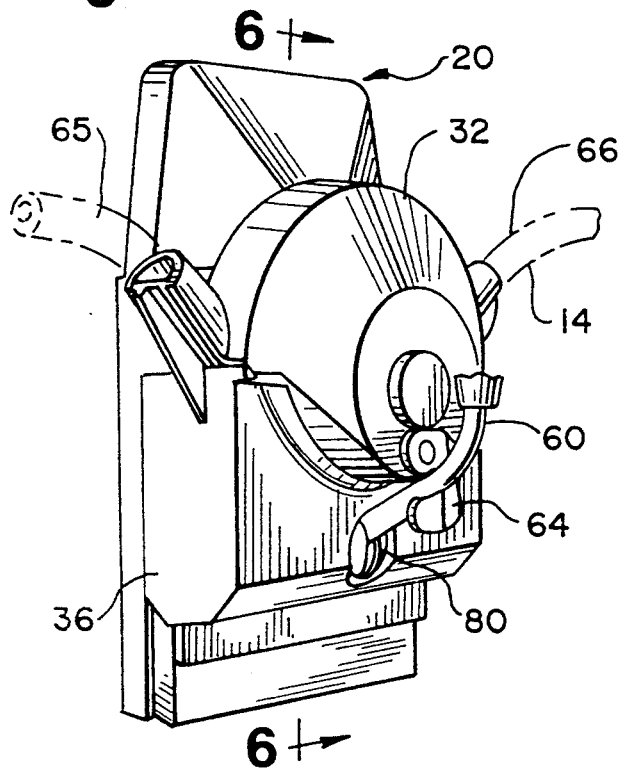
FIG. 4 is a perspective view of the peristaltic pump shown in FIG. 1 in the closed position.
Figure 5:
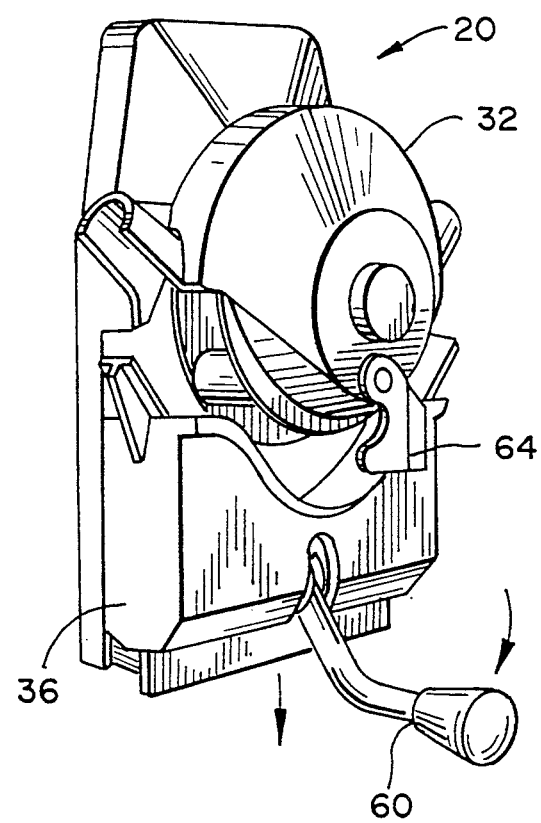
FIG. 5 is a perspective view of the peristaltic pump shown in FIG. 1 in the open position.
Figure 6:
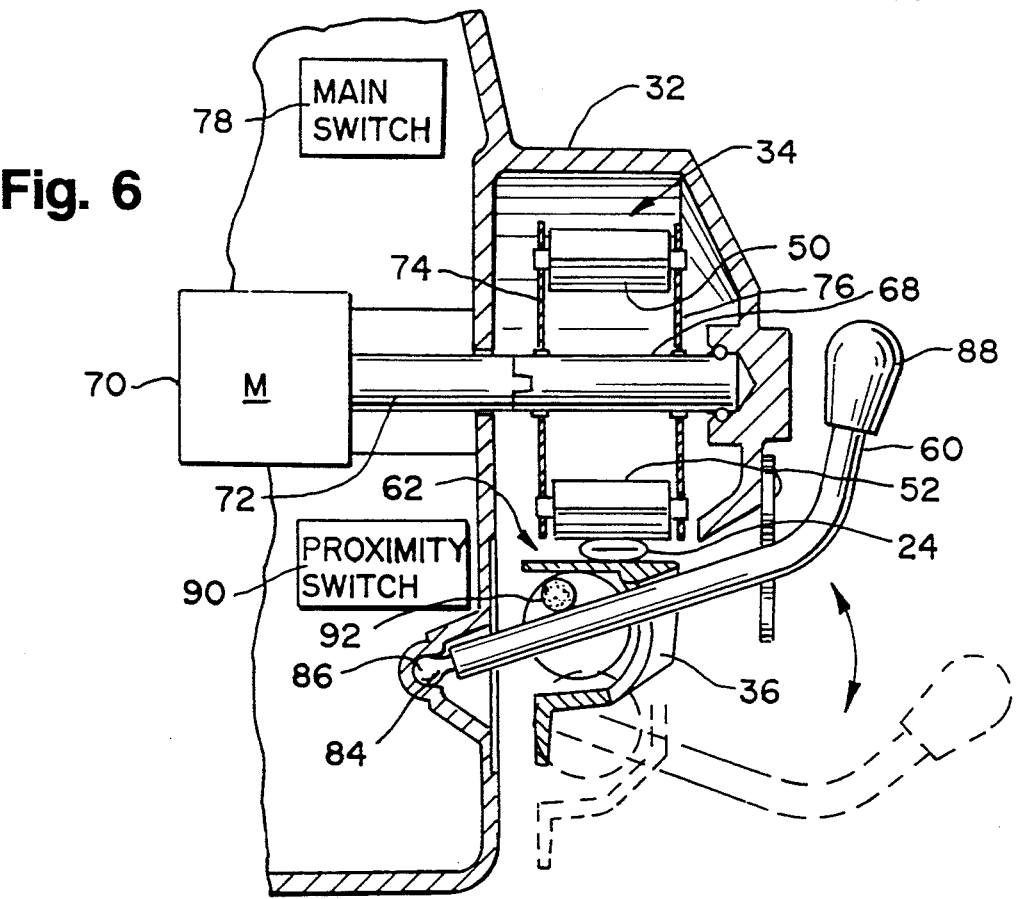
FIG. 6 is a cross-sectional view of the peristaltic pump shown in FIG. 4.

The peristaltic pump 20 used in the system 10 of FIG. 1 for moving a confectionery mixture through the tube 14 is shown in greater detail in FIGS. 4 through 6. The peristaltic pump 20 comprises a pump housing 32, a roller assembly 34 and a sliding portion 36 for securing the tube 14 within the pump 20. The sliding portion 36 has a first or closed position as shown in FIG. 4 and a second or open position as shown in FIG. 5. The roller assembly 34 has a plurality of rollers 50, 52, 54 and 56 (not shown) which, when in operation, intermittently contact tube 14. A lever 60 controls the position of the sliding portion 36. The tube 14 is positioned under the roller assembly 34 in a gap 62 between the roller assembly 34 and the slidable portion 36. The tube 14 forms a generally U-shaped path for the confectionery product to follow from the suction side 65 to the pressure side 66 of the pump. A latch means 64 holds the lever 60 in the closed position. Upon releasing the latch 64 and moving the lever 60 to the second or open position the sliding portion 36 moves relative to the roller assembly 34 as illustrated in FIG. 5.

In FIG. 5 the sliding portion 36 is separated from the housing portion 32 of the pump 20. In this position, the tube 14 can be positioned within the pump 20 or removal from the pump 20. In manual operation, after the tube 14 is properly positioned within the pump 20, the lever 60 is moved to the up position and secured in place by latch 64.

FIG. 6 is a cross section of the pump 20 taken along line 6—6 in FIG. 4. The roller assembly 34 is mounted to the pump housing 32 and driven by roller shaft 68. A motor 70 is mounted to the housing 32 and has a drive shaft 72. The motor shaft 72 is connected to the roller shaft 68 in any well known manner so that rotation of the motor shaft 72 by the motor 70 causes the roller shaft 68 to rotate. The rollers 50, 52, 54 and 56 (not shown) are attached to plates 74 and 76 and are positioned at equal distances from each other and from the roller shaft 68. The shaft 68 is located at the center of the plates 74 and 76. Since the shaft 68 is attached to the plates 74 and 76, rotation of the roller shaft 68 results in rotation of the rollers around the roller shaft 68. A main power on/off switch 78 is also mounted or the housing. Of course, the main power switch 78 can be positioned anywhere as a matter of design choice. The general operation of peristaltic pumps is well known and, accordingly, not described in detail. In addition, only the main structural portions of the pump are shown and many parts have been deleted for the sake of clarity.

The sliding portion 36 is movably mounted relative to the pump housing 32 adjacent to the roller assembly 34. The sliding portion 36 is movable relative to the pump housing 32 by corresponding movement of the lever 60. The front side of the sliding portion 36 has a slot 80 through which the lever 60 passes, and the pump housing 32 includes a cavity 84 for receiving a proximal end 86 of the lever 60. Vertical displacement of the sliding portion 36 is effected by vertical movement of a distal end 88 of the lever 60, which causes corresponding vertical movement of the sliding portion 36. FIG. 6 uses solid lines to show the closed position of the sliding portion 36 and lever 60, and dotted lines to show the open position.

Referring to FIG. 6, the compression portion 24 of the tube 14 is secured in a gap 62 between the roller assembly 34 and the sliding portion 36. The size of the gap 62 depends on whether the sliding portion 36 and the lever 60 are in an open or closed position. When they are in an open position, denoted by dotted lines in FIG. 6, the gap 62 is large enough to allow the compression tube portion 24 to be inserted or removed from between the roller assembly 34 and the sliding portion 36. After the compression portion 24 is inserted in the gap 62, it is secured in the gap 62 by moving the sliding portion 36 into the closed position with the lever 60 and securing the position with latch 64. When the sliding portion 36 is in the closed position, denoted by solid lines in FIG. 6, the compression portion 24 is compressed within the gap 62. The compression portion 24 can be removed from the gap 62 by placing the lever 60 into the open position and removing latch 64. Thus, the operation of the lever 60 in conjunction with the sliding portion 36 allows for easy insertion and removal of the compression tube portion 24 from the peristaltic pump 20.

The sliding portion 36 is generally U-shaped on its upper edge so that the gap 62 formed between the roller assembly 34 and the sliding portion 36 is correspondingly U-shaped. Due to this generally U-shape, the gap 62 forms a trough beneath the roller assembly 34 through which the compression tube portion 24 passes.

When the peristaltic pump 20 is operating, the rollers 50, 52, 54 and 56 (not shown) of the roller assembly 34 intermittently and progressively compress the compression portion 24 against the sliding portion 36. The confectionery mixture in the tube 14 is pumped in the direction in which the rollers 50–56 rotate. The rate of pumping is determined by the rotation rate of the rollers 50–56 around the shaft 68. When the peristaltic pump 20 is turned off or idling, some of the diluted confectionery mixture in the compression tube portion 24 settles into the generally U-shaped trough to form a liquid seal. The liquid seal prevents air in the tube 14 from back flowing from the pressure side 66 to the suction 65 side of the pump 20. The importance of the liquid seal in maintaining the air-to-liquid ratio in the tube 14 was fully described above.

The peristaltic pump 20 is operated by both a proximity switch 90 and the main on/off switch 78. In the preferred embodiment the proximity switch 90 is a magnetically activated switch. The proximity switch is mounted in the pump housing 32. Both the proximity switch 90 and the main switch 78 must be engaged in order for the peristaltic pump 20 to operate. Thus, failure to turn on either switch prevents the peristaltic pump 20 from operating.

The proximity switch 90 is controlled by the position of the sliding portion 36. The proximity switch 90 is magnetically coupled to a magnetic portion 92 in the sliding portion 36. In an alternative embodiment the magnetic portion 36 can be part of the lever 60. Engagement of the proximity switch 90 is dependent upon the closeness of the magnetic portion 92 to the proximity switch 90. When the lever 60 is in the open position, the proximity switch 90 is disengaged because the magnetic portion 92 is not in close enough proximity to the switch 90. However, when the lever 60 is in the closed position, the switch 90 is engaged because it is located adjacent to the magnetic portion 92.

The proximity switch 90 prevents the peristaltic pump 20 from operating when the sliding portion 36 and the lever 60 are in the open position. Even if the main on/off switch 78 is turned on, the pump 20 will not operate unless the proximity switch 90 is also engaged as will be understood by one of ordinary skill in the field. Due to the function of the proximity switch 90, the peristaltic pump 20 does not run when an operator is loading the tube 14 into or out of the pump 20.

Thus, a system and method for dispensing a confectionery product has been described. The system uses a detachable multiple part tube to deliver a confectionery product to a freezing cylinder. A peristaltic pump is used to move the confectionery product. The path of the tube through the peristaltic pump is generally U-shaped. When the pump is idle the confectionery product separates into a diluted confectionery product and air. The diluted confectionery product forms a liquid seal in a trough of the generally U-shaped tube. The liquid seal prevents the air on the pressure side of the pump from back flowing to the suction side and accordingly maintains the consistency of the confectionery product in the tube. The peristaltic pump is opened and closed by a pivoted lever and includes a proximity switch so that the pump only operates when its movable portions are secured.

It will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What is claimed is:

1. A confectionery dispensing system for moving a confectionery mixture having a predetermined ratio of air to fluid to a freezing cylinder, comprising:
    a reservoir containing a confectionery fluid;
    a tube connecting said reservoir to said freezing cylinder;
    an air metering means coupled to said tube for controlling the ratio of air mixed with said confectionery fluid to form said confectionery mixture having a predetermined air to fluid ratio;
    a peristaltic pump having a generally U-shaped path for receiving said tube, said peristaltic pump having an operating mode and an idle mode;
    said tube being positioned in said generally U-shaped path of said peristaltic pump forming a generally U-shaped trough in said tube,
    said peristaltic pump moving said confectionery mixture to said freezing cylinder in said operating mode;
    a liquid seal formed by a portion of said confectionery mixture in said trough in said tube when said peristaltic pump is in said idle mode, said liquid seal preventing the movement of air across the trough in said tube and maintaining the air-to-fluid ratio of said confectionery mixture.

2. The system as recited in claim 1, wherein said peristaltic pump comprises:
    a pump housing;
    a sliding portion movable relative to said pump housing and having an open and a closed position;
    a roller assembly mounted on said pump housing adjacent to said sliding portion;
    means for moving said sliding portion to said closed position adjacent to said pump housing and securing said tube within a generally U-shaped path; and
    a proximity switch mounted on the pump housing for preventing the peristaltic pump from operating when the sliding portion is in said open position.

3. The confectionery dispensing system as recited in claim 2 further comprising a cavity in said pump housing, a slot in said sliding portion and a lever extending through said slot and into said cavity and said lever movable between a open and closed position to move said sliding portion between said open and closed positions.

4. The confectionery dispensing system as recited in claim 3, further comprising a magnetic portion for engaging said proximity switch when said lever is in said closed position and disengaging said proximity switch when said lever is in the open position.

5. A method for use in a confectionery dispensing system for moving a confectionery mixture having a predetermined milo of air-to-fluid and for maintaining said predetermined ratio of air-to-fluid in said confectionery fluid, said confectionery dispensing system having a reservoir containing a confectionery fluid, a freezing cylinder for dispensing said confectionery mixture, a tube connecting said reservoir to said freezing cylinder, an air metering means connected to said tube and a peristaltic pump having an operating mode and an idle mode and being connected to said tube so that there is a suction side of said pump and a pressure side of said pump, said method comprising the steps of:
    moving said confectionery fluid from said reservoir into said tube when said pump is in said operating mode;
    mixing air with said confectionery fluid to form said confectionery mixture having a predetermined air-to-fluid ratio;
    forming a path passing through said peristaltic pump with said tube so that said tube has a portion on said suction side of said pump and a portion on said pressure side of said pump;
    moving said confectionery mixture to said freezing cylinder when said peristaltic pump is in said operating mode;
    forming a liquid seal with a portion of said confectionery mixture in said pressure side of said tube when said peristaltic pump is in said idle mode thereby maintaining said air-to-fluid ratio of said confectionery mixture in said tube on at least said pressure side of said pump.

* * * * *

UNITED STATES PATENT AND TRADEMARK OFFICE
CERTIFICATE OF CORRECTION

PATENT NO.  : 5,349,825
DATED       : September 27, 1994
INVENTOR(S) : Daniel G. Duke, Kenneth J. Emody, Gary P. Almblade It is certified that error appears in the above-indentified patent and that said Letters Patent is hereby corrected as shown below:

In the Abstract: Line 12, after "liquid" add —seal—
Column 5, line 45, change "small" to —small.—
Column 6, line 4, change "widen" to —when—
Column 7, line 55, change "or" to —on—
Column 10, line 30, change "milo" to —ratio—

Signed and Sealed this

Twenty-eight Day of February, 1995

Attest:

BRUCE LEHMAN

*Attesting Officer*     *Commissioner of Patents and Trademarks*